Aug. 7, 1956    W. S. CAHILL    2,758,037
APPARATUS FOR AND A METHOD OF APPLYING
AN ADHESIVE COATING TO RUBBER TIRES
Filed June 17, 1953    4 Sheets-Sheet 3
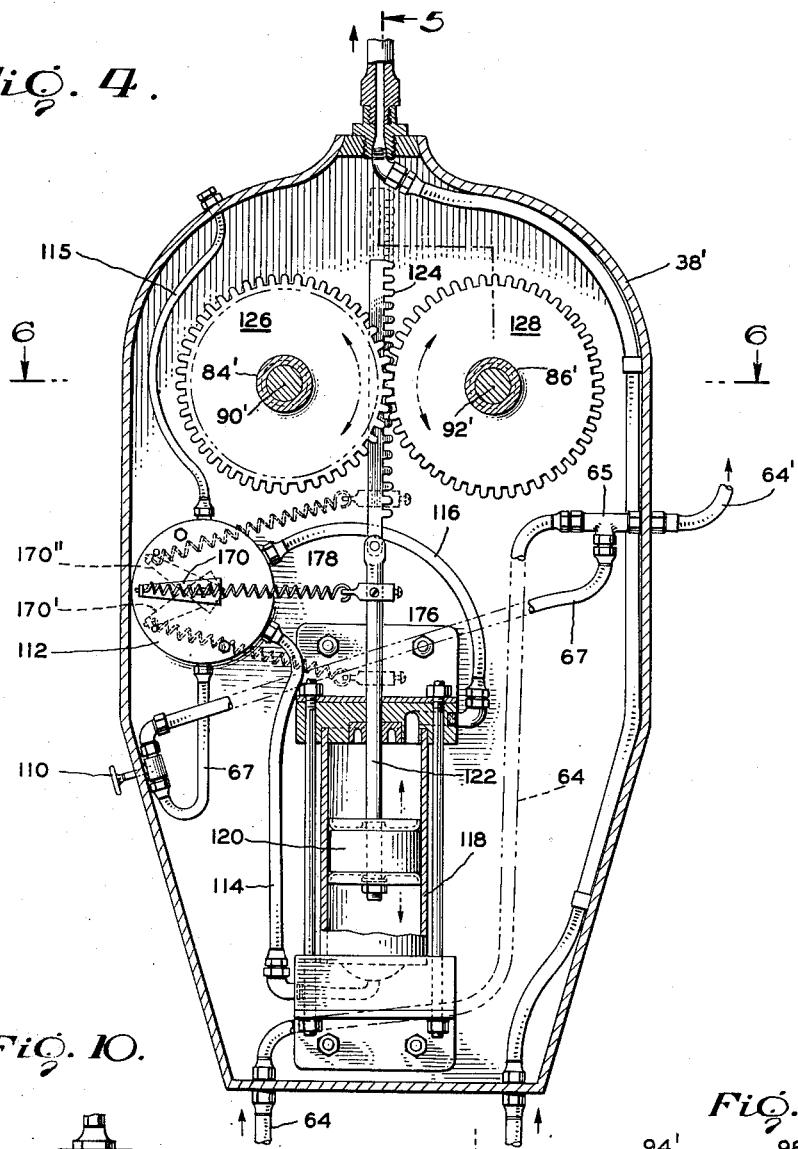
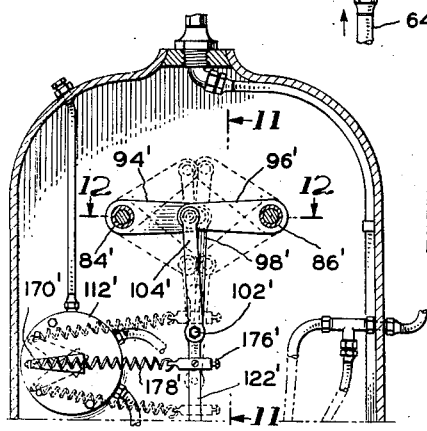
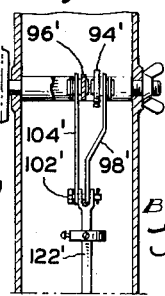
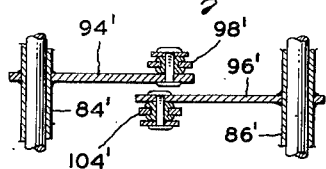
INVENTOR
William S. Cahill
BY
ATTORNEY Aug. 7, 1956 W. S. CAHILL 2,758,037
APPARATUS FOR AND A METHOD OF APPLYING
AN ADHESIVE COATING TO RUBBER TIRES
Filed June 17, 1953 4 Sheets-Sheet 4
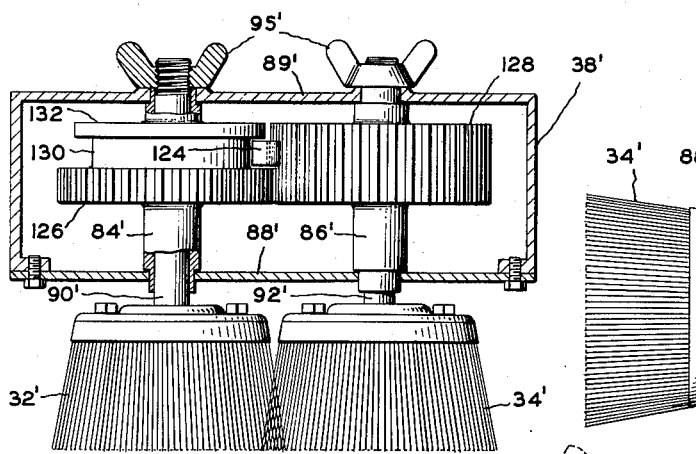
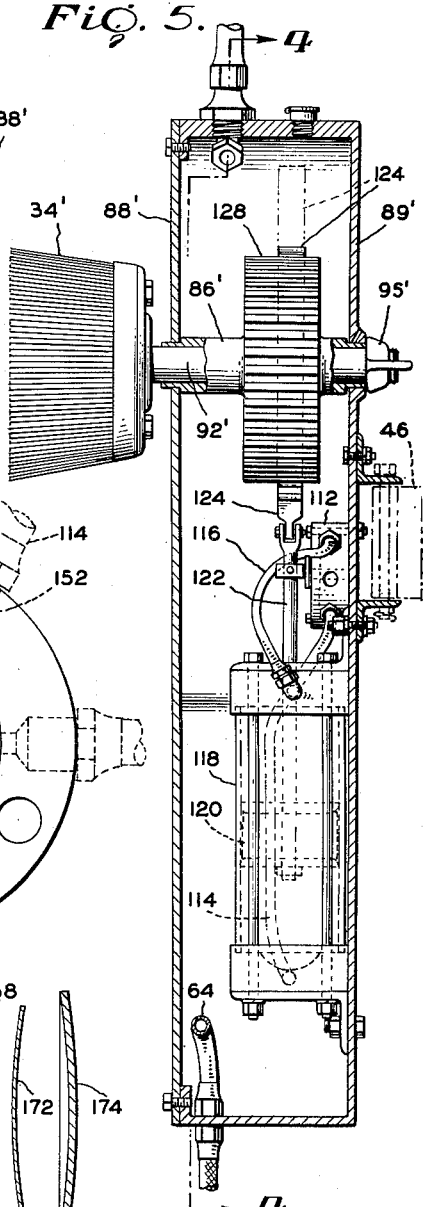
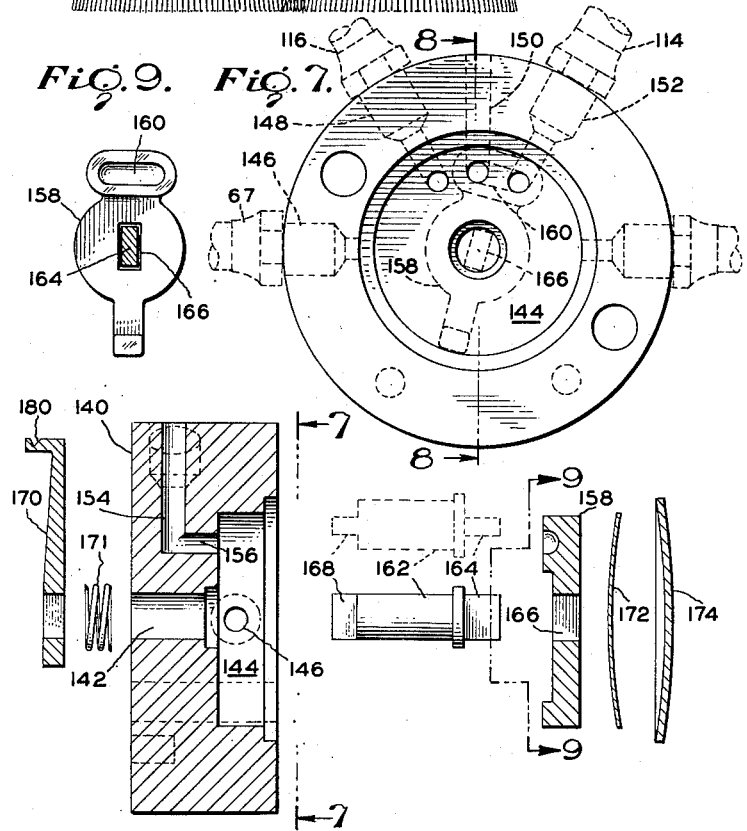
INVENTOR
William S. Cahill
BY
ATTORNEY

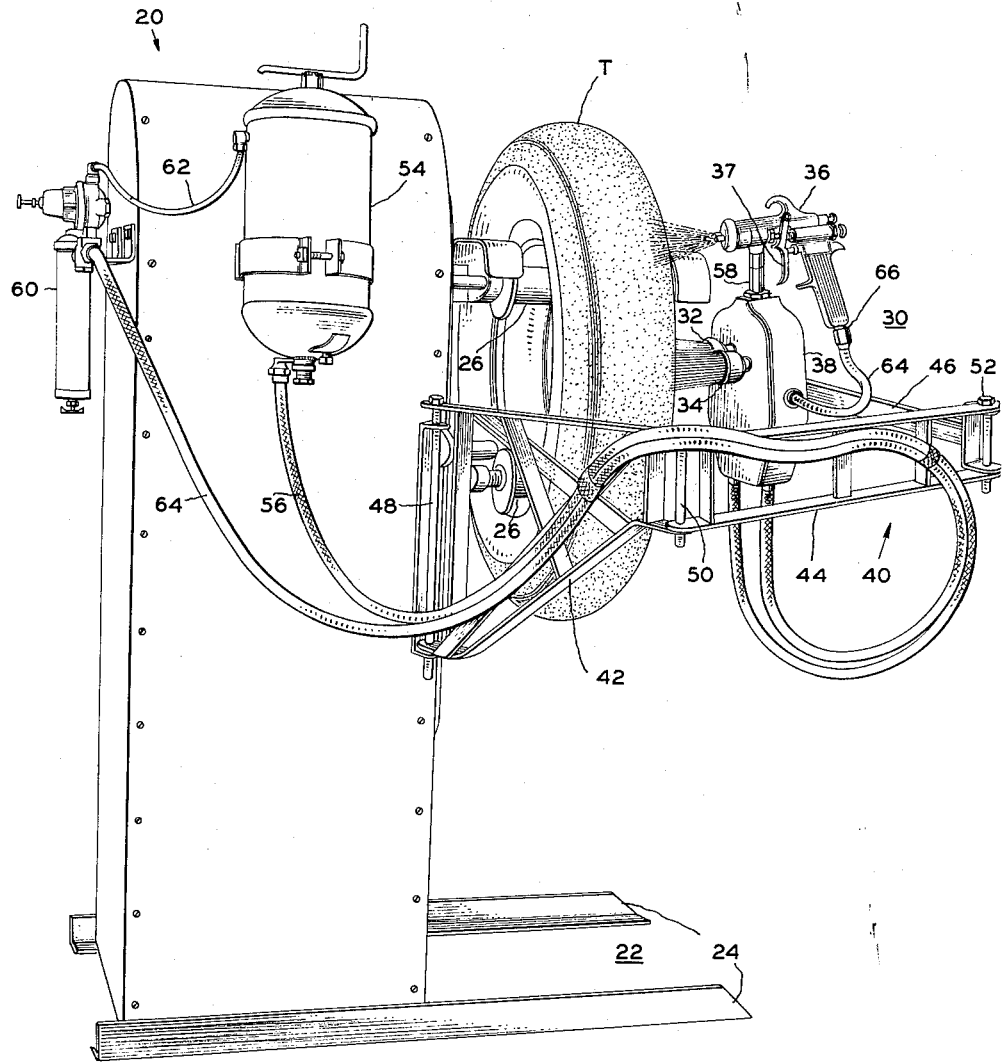

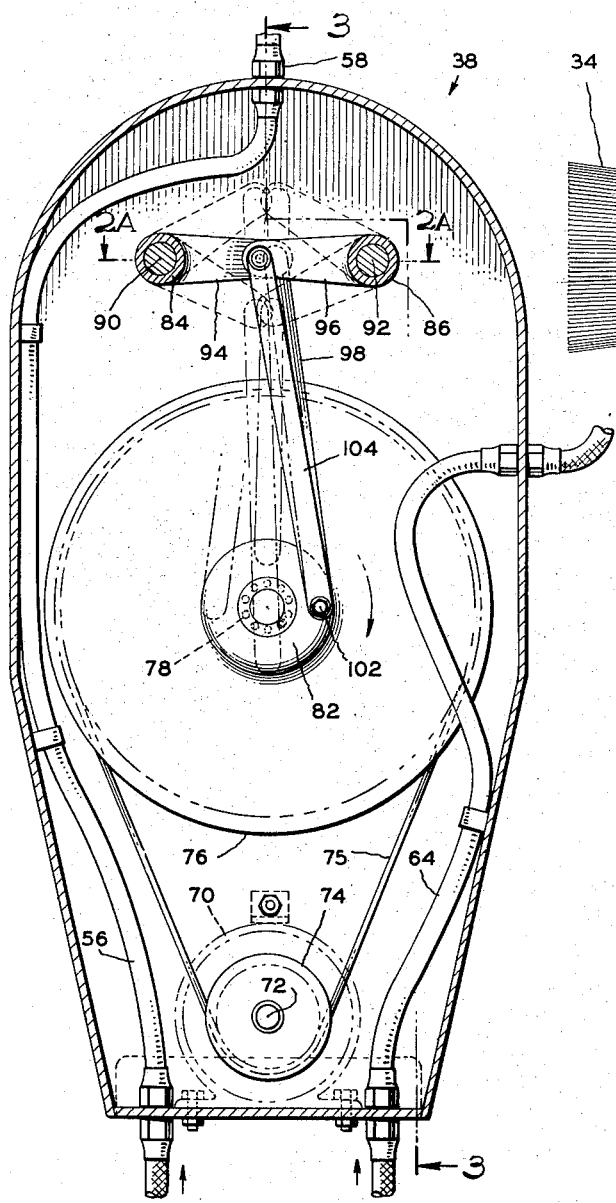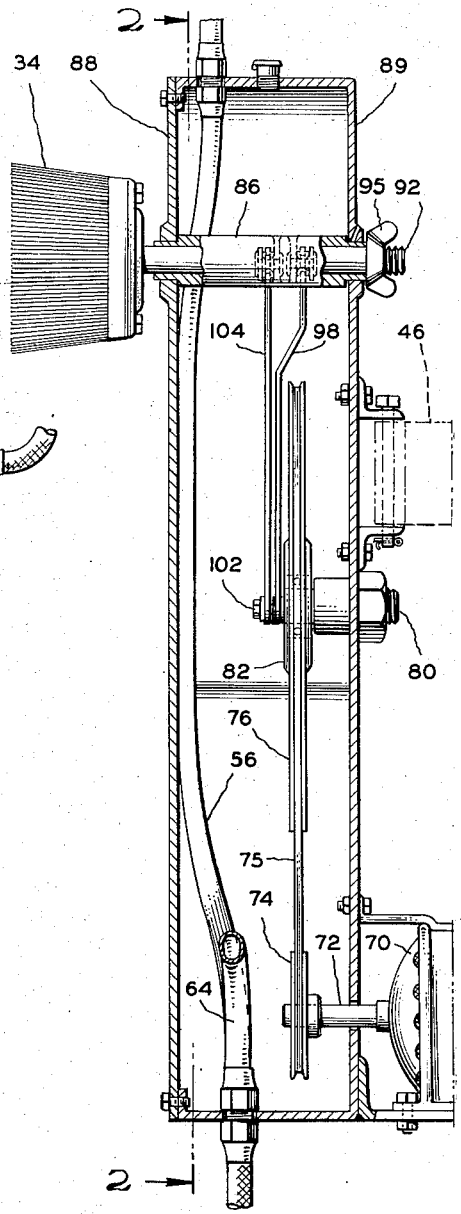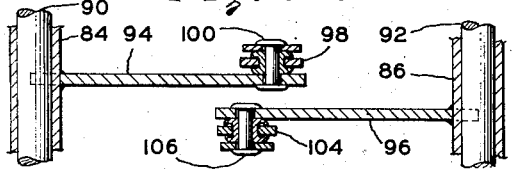

United States Patent Office 2,758,037
Patented Aug. 7, 1956

2,758,037

APPARATUS FOR AND A METHOD OF APPLYING AN ADHESIVE COATING TO RUBBER TIRES

William Starling Cahill, Danville, Va.

Application June 17, 1953, Serial No. 362,323

26 Claims. (Cl. 117—62)

This invention relates to an apparatus for and a method of applying an adhesive coating to rubber tires, and more particularly to an apparatus for and a method of applying cement to tires during the process of recapping.

During the process of recapping worn tires, the old worn tread is first removed by a cutting device, after which a buffing mechanism removes any remaining tread and smooths the crown portion of the tire which is to receive the recap. A cap of rubber strip material is then cemented in place over the crown of the tire, and the tire is vulcanized with the cemented cap in place. This invention relates particularly to an apparatus for and method of applying the cement which joins the cap to the tire.

The manner in which the cement is applied during a recapping operation is an important factor in the success of the recap job. Only a thin coat of cement should be applied, since too thick a coat is detrimental to the success of the union of the tire and the new rubber being applied. The cement should uniformly cover the cap-receiving surface in a thin, even film, filling all irregularities in the tire surface. Tire blow-outs may result if the cement is allowed to puddle in the tire crevices.

The cementing step in accordance with tire recapping apparatus and methods generally in use is an operation which is inefficient in utilization of time, labor, and material. This is true both from the standpoint of the manner in which the cement is applied, and also because of the fact that the cement so applied usually requires about one hour to dry, which delays the beginning of the vulcanization step.

Accordingly, it is an object of this invention to provide an apparatus and method for applying cement to recapped tires which will result in a great saving of time, material and labor in comparison with other apparatus and methods for this purpose.

It is a further object of this invention to provide an apparatus and method which will apply a thin film of cement uniformly over the cap-receiving surface of the tire to provide a strong bond between the cap and the buffed surface of the tire.

It is another object of this invention to provide a method and apparatus for applying cement to a rubber tire surface in accordance with which the drying time of the cement is reduced greatly from that usually required with other methods and apparatus.

In accordance with these objects, this invention provides a tire cementing apparatus comprising a spray gun for spraying cement under pressure onto the buffed surface of the tire while the tire is slowly rotated, and a pair of oscillating brushes which come in contact with the surface of the tire as the cement is being applied, the brushes smoothing the cement on the tire into a thin even coat. After the entire buffed surface of the tire has been covered with cement and has been brushed by the oscillating brushes to smooth the cement, the tire is rotated in the opposite direction. During this reverse rotation, the brushes are again brought into contact with the cement and agitate the cement in such manner that a large proportion of the solvent leaves the cement, to thereby greatly expedite the drying of the cement, so that the cement dries in about five minutes, rather than requiring about one hour to dry as is usually required when other methods and apparatus are used.

The features of this invention which are believed to be novel are set forth with particularity in the appended claims. The invention itself, however, both as to its organization and use, together with further objects and advantages thereof may best be understood by reference to the following description taken in connection with the accompanying drawings in which:

Fig. 1 is a perspective view of a tire cementing apparatus in accordance with the invention.

Fig. 2 is a vertical sectioned elevation as seen on line 2—2 of Fig. 3 of the brushhead casing to illustrate the operation of one form of mechanism which may be used to operate the oscillating brushes.

Fig. 2A is an enlarged fragmentary plan sectional view along line 2A—2A of Fig. 2.

Fig. 3 is a vertical section along line 3—3 of Fig. 2.

Fig. 4 is a vertical sectioned elevation view as seen on line 4—4 of Fig. 5 of the brushhead casing similar to Fig. 2, but illustrating a pneumatically operated mechanism for driving the oscillating brushes.

Fig. 5 is a vertical section along line 5—5 of Fig. 4.

Fig. 6 is a sectioned plan along line 6—6 of Fig. 4 showing details of the oscillating brushes and their operating mechanism in accordance with the pneumatically-driven brush arrangement.

Fig. 7 is a rear elevation view of the air distributing valve used in connection with the pneumatically driven brush arrangement.

Fig. 8 is an exploded side elevation view of the air distributing valve assembly of Fig. 7 as seen along section line 8—8 of Fig. 7.

Fig. 9 is a view along section line 9—9 of Fig. 8 and shows the oscillating valve element of the distributing valve assembly of Fig. 8.

Fig. 10 is a fragmentary sectional elevation view of a still further modified drive arrangement for the oscillating brushes utilizing a pneumatic operating mechanism, but using a connecting rod and crank arm arrangement for driving the oscillating brushes in lieu of a gear drive as in the arrangement of Fig. 4.

Fig. 11 is a fragmentary vertical section along line 11—11 of Fig. 10; and

Fig. 12 is an enlarged fragmentary plan sectional view along line 12—12 of Fig. 10.

Referring now to the drawings, and more particularly to Fig. 1, which shows the overall arrangement of my tire cementing apparatus, a cabinet generally indicated at 20 is supported upon a stationary surface 22, which may be the floor of a garage, for example, cabinet 20 being braced by projecting base members 24 at one side thereof to keep the machine from tilting in that direction under the weight of the tire and the mechanism which extends in that direction. Cabinet 20 serves as a housing for a suitable motor which drives a tire revolving mechanism generally indicated at 26. The tire revolving mechanism comprises a pair of motor driven drive rollers which extend at right angles from the cabinet 20 and engage the tire T at diametrically opposite portions of its inner periphery for the purpose of revolving the tire, in cooperation with press rollers which hold the tire firmly against the drive rollers, the press rollers being adjustable to tires of different sizes.

In accordance with the invention, there is provided a brushhead assembly, generally indicated at 30, and comprising a pair of oscillating brushes 32 and 34 and a cement spray gun 36 mounted on a housing 38. The brushhead assembly 30, including the oscillating brushes 32 and 34, the spray gun 36, and the housing 38, are supported by the cabinet 20 by an articulated or sectionalized bracket assembly generally indicated at 40 comprising a plurality of pivotally connected bracket sections 42, 44, and 46. Bracket section 42 is pivotally connected to the cabinet 20 about a vertical axis 48. Bracket sections 42 and 44 are pivotally connected to each other at the outer end of bracket section 42 and at the inner end of bracket section 44 about a pivotal axis 50, while intermediate bracket section 44 is pivotally connected at its outer end to the inner end of bracket section 46 about a pivotal axis 52. The outermost bracket section 46 is pivotally connected at its outermost end to the brushhead housing 38. The articulated or sectionalized bracket assembly just described permits the brushhead assembly 38, including the oscillating brushes 32 and 34 and the spray gun 36 to be freely moved in a horizontal plane so as to permit the oscillating brushes and the spray gun to reach any desired portion of the tire T to which the recap is being applied. The flexibility of the bracket arm enables the operator to freely move the brushhead assembly from one side to the other of the tire and across the face of the tire.

The cement supply for the spray gun 36 is contained in a tank 54 which is rigidly mounted on the outer surface of the cabinet 20. The flow of cement is communicated to the spray gun from tank 54 through a flexible conduit or tube 56 which extends from the lower end of tank 54 up through the brushhead housing 38 to a rigid hollow tubular fitting 58 to which the spray gun 36 is rigidly attached, as by a screw thread connection, for example. Tubular conduit 58 communicates with the interior of the spray gun, permitting the cement to flow from conduit 56 into the spray gun.

A source of high pressure air, generally indicated at 60, is rigidly supported by an outer surface of cabinet 20. The air supply source 60 communicates with the cement supply tank 54 through a conduit 62 by means of which the high pressure air is admitted above the surface of the cement in tank 54 to force the cement through conduit 56 under pressure to the spray gun 36. The source of air supply 60 is also connected to the brushhead assembly 38 through a flexible conduit 64. As will be seen in Figs. 1 and 2, conduit 64 passes through the brushhead housing 38 and is connected to the air inlet 66 of the spray gun. As will be explained later, on one embodiment of my invention, the oscillating brushes 32 and 34 are pneumatically driven and in this case, the air required for the pneumatic operating mechanism is communicated to the operating mechanism through the air conduit 64.

Referring now to Figs. 2, 2A, and 3, there is shown an embodiment of my invention in which the oscillating brushes are driven by a rotatable prime mover, such as an electric motor, through connecting rods which are attached to crank arms on the oscillating brush shafts. An electric motor 70 (Fig. 3) drives a shaft 72 having a small pulley wheel 74 connected on the outer end thereof. A larger pulley wheel 76 is rotatably supported by ball bearing 78 upon a stud shaft 80, stud shaft 80 being itself supported by side wall 89 of the housing 38. The diameter of the large pulley wheel 76 is proportioned to the diameter of the small pulley wheel 74 to provide a desired speed reduction between motor 70 and the oscillating brushes 32 and 34. A hub member 82 is carried by the outer surface of the large pulley member 76. Pulley wheels 74 and 76 are operatively connected together by belt 75.

A pair of hollow brush operating shafts 84 and 86 extend through the upper portion of the brushhead cabinet 38, being supported by suitable bearing surfaces in the oppositely disposed walls 88 and 89 of cabinet 38. The hollow shafts 84 and 86 are respectively adapted to receive spindles 90 and 92 upon the outer ends of which are respectively mounted the oscillating brushes 32 and 34. The shafts 84 and 86 are spaced apart a distance such that the outer peripheries of the brushes 32 and 34 are in substantially tangential contacting relation. The opposite ends of each of the spindles 90 and 92 are threaded to receive wing nuts 95 which serve to rigidly clamp the respective spindles 90 and 92 to the hollow brush operating shafts 84 and 86 so that each of the spindles turns as a unit with its respective operating shaft.

In order to impart oscillatory motion to the brush operating shafts 84 and 86, shafts 84 and 86 are each respectively provided with an operating arm or crank 94 and 96, each operating arm being rigidly attached at one of its ends to one of the respective brush operating shafts 84 or 86. A connecting rod 98 is pivotally connected by means of a pivot pin 100 to the outer end of arm member 94. The opposite end of connecting rod 98 is pivotally connected by a pin member 102 to an eccentrically located pivot point adjacent the outer periphery of the hub 82. Similarly, a connecting rod 104 is pivotally connected by means of a pin 106 to the outer end of operating arm 96. The opposite end of connecting rod 98 is connected to the hub 82 at the same pivot point 102 where rod 98 is also connected.

It can be seen that when pulley wheel 76 is rotated by motor 70 through pulley 74 and belt 75, the pivot point 102 about which the connecting rods 98 and 104 are pivotally connected to hub 82 rotates at the same angular velocity as large pulley wheel 76. This rotation of the pivotal connection 102 of connecting links 98 and 104 causes the respective brush operating arms 94 and 96 to be oscillated back and forth between the extreme positions indicated in dotted outline in Fig. 2. The oscillation of brush operating arms 94 and 96 in the manner just described causes the respective brushes 32 and 34 to be oscillated in opposite directions. That is, when pivot point 102 is moving in a clockwise direction (with respect to the view shown in Fig. 2) downwardly toward the lower portion of casing 38, brush arm 94 will be moved to operate brush 32 in a clockwise direction, and, at the same time, brush operating arm 96 is moved to operate brush 34 in a counterclockwise direction. When the pivot point 102 begins to move upwardly again in a clockwise direction, the brush operating arm 94, and therefore, the brush 32 is moved in a counterclockwise direction, while, at the same time, the brush operating arm 96, and therefore, brush 34 is moved in a clockwise direction. This oscillatory motion of the brushes 32 and 34 causes the cement, which is sprayed on the tire T, to be evenly distributed in a thin film over the portion of the tire which is to receive the recap when the brushes are applied to the cement deposited on the tire surface.

There is shown in Figs. 4, 5, and 6, a modified embodiment of my invention in accordance with which the oscillating brushes are pneumatically driven from the same source of high pressure air 60 which provided the air supply for the spray gun 36. In this embodiment of the invention, the air conduit 64 passes into the interior of the brushhead housing 38' where it is joined to a T-connection 65. One of the outlet ends of the T connection 65 is connected through conduit 64' to the air inlet end 66 of the spray gun 36. The other end of the T connection 65 is connected through a conduit 67 in series with a cut-off valve 110 to an air distributing valve generally indicated at 112. A conduit 115 is connected to valve 112 to supply lubricant to the oscillating valve element which will be described hereinafter. The distributing valve 112 is provided with two outlet conduits 114 and 116 which are respectively connected to the lower and upper ends of a pneumatic operating cylinder 118 below and above a piston 120 which reciprocates within the operating cylinder 118. A piston rod 122 is vertically movable with the piston 120. The upper end of piston rod 122 is connected to a rack gear member 124 which reciprocates gears 126 and 128 to cause an oscillating rotary motion of brushes 32' and 34'.

A pair of brush operating shafts 84' and 86' are laterally spaced apart from each other and supported for oscillatory rotary movement in suitable bearing surfaces in the oppositely disposed walls 88' and 89' of the brushhead housing 38'. The spur gear 126 is rigidly mounted on brush operating shaft 84' and spur gear 128 is rigidly attached to operating shaft 86'. Spindle 90' of brush 32' is adapted to be received within the hollow interior of brush operating shaft 84' and spindle 92' of brush 34' is adapted to be received in the hollow interior of shaft 86'. The respective spindles 90' and 92' are adapted to be clamped to their respective brush operating shafts by means of wing nut members 95' which maintain the respective spindles rigid with respect to the respective brush operating shafts so that the spindles turn as a unit with their respective brush operating shafts.

As will best be seen in Fig. 6, spur gear 128 is made approximately twice as wide as spur gear 126. The rack member 124 which is driven by piston rod 122 meshes with the portion of spur gear 128 which does not engage spur gear 126. A hub-like guide member 130 provided with a peripheral flange 132 is rigidly attached to the brush operating shaft 84' opposite the portion of spur gear 128 which meshes with rack 124. Guide member 130 serves as a retainer or guide for the rack member 124 in its reciprocatory motion. Rack member 124 engages gear 128 in driving relation on one portion of the surface of gear 128 and the opposite portion of gear 128, which does not engage rack 124, engages spur gear 126, to drive spur gear 126 and brush 32'.

In the pneumatically driven brush arrangement of Figs. 4, 5, and 6, air is admitted alternately to opposite ends of the operating cylinder 118 under the control of distributing valve 112 in such manner as to cause the piston 120 to reciprocate back and forth in the cylinder 118 to thereby cause the reciprocation of rack 124. The means by which this reciprocating motion of piston 120 is accomplished will now be described. In this connection, reference is made particularly to Figs. 4 and to Figs. 7–9 which show the details of the distributing valve structure.

The distributing valve generally indicated at 112 comprises an outer housing 140 provided with an axial passage 142 in communication with an air manifold chamber 144. The housing 140 is provided with an air inlet passage 146 which is in communication with the chamber 144, passage 146 being connected to air inlet conduit 67 to the source of high pressure air 60. Three circumferentially spaced passages respectively designated as 148, 150 and 152 extend from openings at the outer periphery of the housing 140 into communication with the air manifold chamber 144.

Passage 148 is connected through conduit 116 to the upper end of cylinder 118. Passage 152 is connected through conduit 114 to the lower end of the cylinder 118. Passage 150, which is disposed circumferentially intermediate passages 148 and 152, is connected to the air exhaust. Each of the passages 148, 150 and 152, is provided with a radially extending portion similar to duct portion 154 of Fig. 8 which communicates with air manifold chamber 144 by means of axially extending portion such as duct portion 156 in Fig. 8. Portion 154 of each of the respective passages 148, 150, and 152 is positioned on a level above that of the air manifold chamber 144, and the axially extending portion of each of the respective passages extends axially into communication with chamber 144.

An oscillating valve element 158, shown in detail in Fig. 9, is adapted to be received in air manifold chamber 144. Valve element 158 is provided with a recessed portion 160 at one of its ends, recessed portion 160 having a sufficient circumferential extent to span the distance between any two of the adjacent passages 148, 150, and 152, where these passages communicate with the air manifold chamber 144.

Air may be either supplied to or exhausted from the respective ends of the cylinders through the passages 148 and 152 and conduits 116 and 114 merely by shifting the oscillating valve element 158 so that its recess 160 spans the distance between one or the other of the passages 148 or 152 and the exhaust passage 150. The passage 148 or 152 which is not connected by valve element 158 to the exhaust 150 is in direct communication with air manifold chamber 144 from whence it supplies high pressure air to one end of cylinder 118.

A valve shaft 162 is adapted to be received in the axial passage 142 of valve housing 140. One end of valve shaft 162 is provided with a flat end portion 164 which is received in a rectangular shaped axial bore 166 in valve element 158. Said rectangular shaped bore 166 is of slightly larger dimensions than flat end portion 164 to assure an easily slip fit. As pneumatic piston shaft is driven up and down, spring member 178 tends to pull valve operating arm 170 over center into position 170', said spring exerts positive pull of arm 170 which in turn pulls valve 158 by means of its connection 164 in rectangular shaped axial bore 166. A spiral spring 171 surrounds valve shaft 162 and normally urges the shaft 162 into a position in which its collar 163 seats in the recess 165 in the housing to provide a seal against loss of air pressure. A valve operating arm 170 is rigidly attached to the end 168 of valve shaft 162. The valve element 158 is maintained in assembled relation in the chamber 144 of housing 140 by means of a spring 172 (Fig. 9) which is received in the outer portion of chamber 144 and bears against the underneath surface of valve 158 to hold the valve seated against the innermost face of chamber 144. A plug member 174 serves as a closure at the outer portion of chamber 144.

As will best be seen in Figs. 4 and 8, the piston rod 122 is provided with a bracket member 176 which serves as an anchor for a spring member 178 which is attached to an upwardly extending spring retaining arm 180 at the radially outer end of valve operating arm 170. When the piston rod 122 moves past a position in which the spring member 178 is in dead center position with respect to the valve operating arm 170, the spring 178 snaps the arm 170 overcenter into either one of the extreme positions shown in dotted outline in Fig. 4. Thus, when the piston rod member 122 moves slightly beyond the dead center position in a downward direction, the valve operating arm 170 is moved to the position indicated at 170' in dotted outline in Fig. 4. Appropriate stop members are provided to limit the travel of arm 170 in either direction. On the other hand, when the piston rod 122 moves just past the dead center position in an upward direction, the valve operating arm 170 is moved to the position indicated in dotted outline at 170'.

Due to the provision of enlarged rectangular shaped axial bore 166 shown in Fig. 8 and Fig. 9, there is a slight lost motion relation between the operating shaft 162 and the oscillating valve element 158 so that valve element 158 is not moved until the piston 120 has reached nearly the end of the cylinder 118. When valve shaft 162 engages the sides of axial bore 166 of valve element 158, the valve is moved in such manner as to disconnect one end of the cylinder 118 from the air pressure supply and to connect the same end to the exhaust outlet and to connect the opposite end of the cylinder to the air supply.

Assume, for example, that the piston 120 is moving in a downward direction. The downward direction of piston 120 is due to air pressure passing through passage 148 of distribution valve 112 and through conduit 116 to the inlet in the upper portion of cylinder 118. During this downward motion of piston 120, there is free communication between the opening of conduit 148 and air manifold chamber 144 of the valve 140. This permits air passing in through the air inlet 146 from conduit 67 to pass directly from the air manifold 144 to passage 148. At this time, the oscillating valve element 158 is in the dotted outline position shown in Fig. 7 in which the recessed portion 160 bridges the respective inlets of passages 152 and 150 to the air manifold 144. Thus, air is being exhausted from the lower end of cylinder 118 through conduit 114 to inlet passage 152 in the distribution valve, thence through the recess 160 of the valve element 158 and through recess 160 to the exhaust passage 150.

When the valve operating arm 170 has been moved past the dead center position sufficiently to engage the sides of enlarged rectangular shaped axial bore 166 of valve element 158 it moves operating valve 158 from the position shown in dotted outline in Fig. 7 to a position where it bridges the respective inlets of passages 148 and 150 to the air manifold chamber. This causes air to be exhausted from the upper end of the cylinder through conduit 116, through passage 148 of valve 112, through the recess 160 of the operating member 158, and outwardly through the exhaust passage 150. Also, the conduit 152 is then in free communication with the air manifold chamber 144 and therefore air passes from the air manifold 144 through the passage 152 and conduit 114 to the lower end of the cylinder 118 and causes the upward motion of the piston 120.

The reciprocating motion imparted to the piston rod 122 in the manner just described causes the rack member 124 of Fig. 4 to be reciprocated back and forth to thereby impart an oscillatory rotary motion to spur gear 128, which, in turn drives spur gear 126. This causes brushes 32' and 34', which are respectively driven by the gears 126 and 128, to be oscillated back and forth in opposite directions.

There is shown in Figs. 10, 11, and 12 a still further modification of the invention in which the reciprocating motion of a pneumatically driven piston rod causes an oscillatory motion of the brushes through connecting links similar to those described in connection with the embodiment of Figs. 2, 2A and 3. In this embodiment, the upper end of a piston rod 122' is pivotally connected to a pair of connecting rods or links 104' and 98' at a point of pivotal connection 102'. The upper end of link 104' is pivotally connected to the outer end of a brush operating arm or crank 96' which is rigidly connected to a hollow shaft 86' which receives one of the brush spindles. Similarly, connecting rod 98' is pivotally connected to the outer end of brush operating arm 94'. The opposite end of arm 94' is rigidly connected to hollow shaft 84' which receives the spindle of one of the brushes. Reciprocating motion of piston rod 122' causes a reciprocating motion of the connecting rods 104' and 98' and thereby imparts an oscillatory rotary motion to the shafts 84' and 86' and therefore to the brushes whose spindles are received by shafts 84' and 86'. The pneumatic mechanism for causing the reciprocation of piston rod 122' is similar to that already described in connection with the embodiment of Figs. 4 to 9, inclusive. Thus, a distributing valve 112' is provided with a valve operating arm 170 which is moved by a spring 178' attached to bracket member 176' on the piston 122' so that motion of the piston rod 122' past dead center position of valve operating arm 170 causes a reversal of the air supply to the cylinder in which piston rod 122' moves.

In applying a recap to a tire using the apparatus and method of this invention, the tire T which has been suitably buffed and is ready for the application of cement is mounted for rotation on the tire rotating means 26 of Fig. 1. The control means associated with the high pressure air supply 60 is actuated to cause air to be communicated through conduit 62 to the cement containing tank 54 to cause cement to be moved through the conduit 56 and fitting 58 to the spray gun 36. The high pressure air also passes through conduit 64 to the air inlet 66 of the spray gun 36. The cement is sprayed onto the portion of the tire which is to receive the recap by actuation of trigger 37 of the spray gun, the tire being slowly revolved during the application of the cement. Due to the sectionalized bracket assembly 40, the operator can move the spray gun freely in order to apply the sprayed cement to any desired portion of the tire surface. The cement is forced by the spray gun into the crevices and into the bottom of the grooves of the buffed tire. This insures complete coverage and penetration of the bonding surface between the tire and the cap which is to be applied.

As the cement is being applied, the oscillating brushes 32 and 34 are driven by any of the oscillatory mechanisms hereinbefore described and cause the brushes to smooth the sprayed cement in a thin film evenly over the surface of the tire. The brushes have a stipulating effect which eliminates any puddling of the cement in the lower part of the crevices, thereby reducing danger of tire blow-outs due to this cause. After the cap receiving portion of the tire has been completely covered with cement, the direction of rotation of the tire is reversed. The brushes are again brought into contact with the surface of the tire during the period of reversed rotation. No additional cement is applied during this reversed rotation period. The brushes then agitate the cement in such a way that a large proportion of the solvent in the cement is removed. This permits the operator to apply the recap within a period of about five minutes, in contrast to the one hour wait which is usually required in accordance with conventional methods of applying recaps.

The thin film of cement which is applied using the apparatus and method of this invention provide a much better bond between the cap and the tire than apparatus and methods usually employed. The thick cement coatings which frequently result from the use of other apparatus and methods are detrimental to the union of the tire and the new rubber being applied.

The method and apparatus of this invention not only provide a great saving of time in the application of a recap due to the much faster drying of the cement, but also reduce labor and material costs considerably. Thus, the method and apparatus of the invention provide a much better recap job with a considerable saving of time, labor, and material.

While there have been shown and described particular embodiments of the invention, it will be obvious to those skilled in the art that various changes and modifications can be made therein without departing from the invention, and, therefore, it is aimed in the appended claims to cover all such changes and modifications as fall within the true spirit and scope of the invention.

Having thus set forth and disclosed the nature of this invention, what is claimed is:

1. An apparatus for applying a coating of adhesive material to a buffed rubber tire surface comprising a spray gun means for spraying said adhesive material under pressure onto said surface, means connecting said spray gun to a supply of adhesive material, means connecting said spray gun to a source of high pressure air, brush means mounted for transverse motion across said buffed tire surface for brushing adhesive material applied to said surface by said spray gun, and means for imparting rotary motion to said brush means about an axis perpendicular to the buffed tire surface at the point of contact therewith.

2. An apparatus for applying a coating of cement to a buffed rubber tire surface comprising a spray gun means for spraying said cement under pressure onto said surface, means connecting said spray gun to a supply of cement, means connecting said spray gun to a source of high pressure air, brush means mounted for transverse motion across said buffed tire surface for brushing said cement applied to said surface by said spray gun, and drive means for imparting an oscillating rotary motion to said brush means about an axis perpendicular to the buffed tire surface at the point of contact therewith.

3. An apparatus for applying a coating of cement to a buffed rubber tire surface comprising, in combination, a spray gun means for applying said cement under pressure onto said surface, means connecting said spray gun to a supply of cement, means connecting said spray gun to a supply of high pressure air, a brushhead housing mounted for transverse motion across said buffed tire surface, at least one brush supported for rotation by said housing, said brush projecting forwardly of said housing for engagement with said tire, and drive means contained in said housing for imparting an oscillatory rotary motion to said brush means about an axis perpendicular to the buffed tire surface at the point of contact therewith.

4. An apparatus as defined in claim 3 in which said drive means comprises a pneumatic cylinder mounted inside said housing, a piston member reciprocable within said pneumatic cylinder, and means connecting said piston member to said brush means whereby reciprocation of said piston member imparts oscillatory rotary motion to said brush means.

5. An apparatus as defined in claim 3 in which said drive means comprises a pneumatic cylinder mounted inside said housing, a piston member reciprocable within said cylinder, a piston rod member movable with said piston, distributing valve means for alternately connecting said high pressure air supply means to opposite ends of said cylinder in accordance with motion of said piston rod, and means connecting said piston rod member to said brush means whereby reciprocation of said piston rod member imparts oscillatory rotary motion to said brush means.

6. An apparatus as defined in claim 5 in which said means connecting said piston rod member to said brush means is a rack gear engageable with a gear carried by said brush means.

7. An apparatus as defined in claim 5 in which said brush means is supported by a shaft means, and said means connecting said piston rod member to said brush means comprises an operating arm extending radially from said shaft means, and connecting link means joining said operating arm to said piston rod member.

8. An apparatus for applying a coating of cement to a buffed rubber tire surface comprising a brushhead housing mounted for transverse motion across said buffed tire surface, a spray gun supported by said housing for applying said cement under pressure onto said tire surface, means connecting said spray gun to a supply of cement, means connecting said spray gun to a supply of high pressure air, at least one brush supported for rotation by said housing, said brush projecting forwardly of said housing for engagement with said tire, and drive means contained in said housing for imparting a rotary motion to said brush means about an axis perpendicular to the buffed tire surface at the point of contact therewith.

9. An apparatus for applying a coating of cement to a rubber tire surface comprising, in combination, a spray gun means for applying said cement under pressure onto said surface, means connecting said spray gun to a supply of cement, means connecting said spray gun to a supply of high pressure air, a brushhead housing, a pair of brushes mounted on parallel shafts supported by said housing, and drive means contained in said housing for imparting oscillatory rotary motion in opposite clockwise directions to said brushes.

10. An apparatus for applying a coating of cement to a rubber tire surface comprising, in combination, a spray gun means for applying said cement under pressure onto said surface, means connecting said spray gun to a supply of cement, means connecting said spray gun to a supply of high pressure air, and means for smoothing the cement sprayed on said tire surface comprising a brushhead housing, a pair of brushes mounted on parallel shafts supported by said housing, and drive means contained in said housing for imparting oscillatory rotary motion in opposite clockwise directions to said brushes.

11. An apparatus for applying a coating of cement to a rubber tire surface, comprising, in combination, a brushhead housing, a spray gun supported by said housing for applying said cement under pressure onto said tire surface, means connecting said spray gun to a supply of cement, means connecting said spray gun to a supply of high pressure air, a pair of brushes, parallel rotatable shaft means for supporting said respective brushes, said shaft means being supported by said brushhead housing and being laterally spaced from each other a distance such that the outer peripheries of said brushes are substantially in contacting relation, operating arms extending radially from each of said brush supporting shafts, and vertically reciprocable means connected to each of said respective operating arms for imparting oscillatory rotary motion to said brush shafts.

12. An apparatus for applying a coating of cement to a rubber tire surface, comprising, in combination, a brushhead housing, a spray gun supported by said housing for applying said cement under pressure onto said tire surface, means connecting said spray gun to a supply of cement, means connecting said spray gun to a supply of high pressure air, a pair of brushes, parallel rotatable shaft means for supporting said respective brushes, said shaft means being supported by said brushhead housing and being laterally spaced from each other a distance such that the outer peripheries of said brushes are substantially in contacting relation, operating arms extending radially from each of said brush supporting shafts, a rotatable disk member mounted in said brushhead housing, means for rotating said disk member, a pair of connecting link members pivotally connected to an eccentric point on said disk member, each of said connecting link members being pivotally connected to a respective one of said operating arms, rotation of said disk member causing vertical reciprocation of said connecting link members to thereby impart an oscillatory rotary motion to said brush supporting shafts.

13. An apparatus for applying a coating of cement to a rubber tire surface, comprising, in combination, a brushhead housing, a spray gun supported by said housing for applying said cement under pressure onto said tire surface, means connecting said spray gun to a supply of cement, means connecting said spray gun to a supply of high pressure air, a pair of brushes supported for rotation by said hosuing, rotatable shaft means for supporting said brushes, said shaft means being supported by said brushhead housing and being laterally spaced from each other a distance such that the outer peripheries of said brushes are substantially in contacting relation, gear means carried by each of said brush supporting shafts, a pneumatic cylinder mounted inside said housing, a piston member reciprocable in said pneumatic cylinder, a piston rod member movable with said piston, distributing valve means for alternately connecting said high pressure air supply to opposite sides of said cylinder in accordance with motion of said piston rod, a rack gear movable with said piston rod, said rack gear imparting an oscillating rotary motion to said gears carried by said brush supporting shafts.

14. An apparatus for applying a coating of cement to a rubber tire surface, comprising, in combination, a brushhead housing, a spray gun supported by said housing for applying said cement under pressure onto said tire surface, means connecting said spray gun to a supply of cement, means connecting said spray gun to a supply of high pressure air, a pair of brushes, a pair of parallel rotatable shafts for supporting said respective brushes, said shafts being supported by said brushhead housing and being laterally spaced from each other a distance such that the outer peripheries of said brushes are substantially in contacting relation, an operating arm extending radially from each of said brush supporting shafts, a pneumatic cylinder mounted inside said housing, a piston member reciprocable in said pneumatic cylinder, a piston rod member movable with said piston, distributing valve means for alternately connecting said high pressure air supply to opposite sides of said cylinder in accordance with motion of said piston rod, link means connecting said piston rod to each of said operating arms whereby reciprocation of said piston rod imparts oscillatory rotary motion to said brush supporting shafts through said link means.

15. A method of applying cement to a buffed rubber tire surface having grooves and crevices which is to receive a strip of recap material which comprises spraying said cement onto said buffed surface and brushing said cement in a rotary direction about an axis perpendicular to the buffed tire surface at the point of contact therewith to smooth said cement evenly over said surface.

16. A method of applying cement to a rubber tire surface which is to receive a strip of recap material which comprises spraying said cement onto said surface and brushing said cement on said surface with a pair of closely spaced brushes moving in opposite clockwise directions with an oscillatory rotary motion.

17. A method of applying an adhesive coating to a rubber tire surface which comprises the steps of mounting said tire for rotation, spraying an adhesive material onto said surface while rotating said tire, and simultaneously brushing said adhesive material on said surface with an oscillatory rotary brushing movement to evenly spread the adhesive material onto said surface.

18. A method of treating a rubber tire surface preparatory to applying a recap to said surface which comprises applying a coating of cement onto said surface, and substantially concurrently brushing said cement on said surface with a pair of closely spaced brushes moving in opposite clockwise directions with an oscillatory rotary motion.

19. A method of applying a solvent-containing cement composition to a buffed rubber tire surface having grooves and crevices which comprises mounting said tire for rotation, spraying said cement composition under pressure onto said tire surface while slowly rotating said tire, substantially simultaneously brushing said cement composition deposited on said surface in a rotary direction about an axis perpendicular to the buffed tire surface at the point of contact therewith to evenly spread said composition over said surface, then rerotating said tire and rebrushing said cement composition to cause removal of solvents from said composition.

20. A method of treating a rubber tire surface preparatory to applying a recap to said surface which comprises applying a coating of cement onto said surface while slowly rotating said tire through at least one complete revolution, brushing said cement concurrently with said spraying during said revolution using a pair of closely spaced brushes moving in opposite clockwise directions with an oscillatory rotary motion, then rotating said tire through at least one additional revolution and rebrushing said cement applied during said first revolution to aid in removing solvent from said cement.

21. A method of applying a solvent-containing cement to a rubber tire surface which is to receive a strip of recap material which comprises spraying said cement onto said surface while slowly rotating said tire through at least one complete revolution, brushing said cement concurrently with said spraying during said revolution with a pair of closely spaced brushes moving in opposite clockwise directions with an oscillatory rotary motion, then rotating said tire through at least one additional revolution and rebrushing said cement applied during said first revolution to aid in removing solvent from said cement.

22. An apparatus for applying cement to a rubber tire surface which is to receive a strip of recap material comprising, in combination, a cabinet member, a tire rotating means supported by said cabinet member, air supply and cement supply means carried by said cabinet, a brushhead housing, said brushhead housing being supported by an articulated bracket assembly pivotally supported by said cabinet, a spray gun means mounted on said brushhead housing, means for connecting said air supply means and said cement supply means to said spray gun, brush means carried by said brushhead housing, and drive means contained in said housing for imparting an oscillatory rotary motion to said brush means.

23. In an apparatus for applying a coating of cement to a rubber tire surface, a brushhead housing, a pair of brushes, parallel rotatable shaft means for supporting said respective brushes, said shaft means being supported by said brushhead housing and being laterally spaced from each other a distance such that the outer peripheries of said brushes are substantially in contacting relation, operating arms extending radially from each of said brush supporting shafts, and vertically reciprocable means connected to each of said respective operating arms for imparting oscillatory rotary motion to said brush shafts.

24. In an apparatus for applying a coating of cement to a rubber tire surface, a brushhead housing, a pair of brushes, parallel rotatable shaft means for supporting said respective brushes, said shaft means being supported by said brushhead housing and being laterally spaced from each other a distance such that the outer peripheries of said brushes are substantially in contacting relation, operating arms extending radially from each of said brush supporting shafts, a rotatable disk member mounted in said brushhead housing, means for rotating said disk member, a pair of connecting link members pivotally connected to an eccentric point on said disk member, each of said connecting link members being pivotally connected to a respective one of said operating arms, rotation of said disk member causing vertical reciprocation of said connecting link members to thereby impart an oscillatory rotary motion to said brush supporting shafts.

25. In an apparatus for applying a coating of cement to a rubber tire surface, a brushhead housing, a pair of brushes supported for rotation by said housing, rotatable shaft means for supporting said brushes, said shaft means being supported by said brushhead housing and being laterally spaced from each other a distance such that the outer peripheries of said brushes are substantially in contacting relation, gear means carried by each of said brush supporting shafts, a pneumatic cylinder mounted inside said housing, a piston member reciprocable in said pneumatic cylinder, a piston rod member movable with said piston, distributing valve means for alternately connecting said high pressure air supply to opposite sides of said cylinder in accordance with motion of said piston rod, a rack gear movable with said piston rod, said rack gear imparting an oscillating rotary motion to said gears carried by said brush supporting shafts.

26. In an apparatus for applying a coating of cement to a rubber tire surface, a brushhead housing, a pair of brushes, a pair of parallel rotatable shafts for supporting said respective brushes, said shafts being supported by said brushhead housing and being laterally spaced from each other a distance such that the outer peripheries of said brushes are substantially in contacting relation, an operating arm extending radially from each of said brush supporting shafts, a pneumatic cylinder mounted inside said housing, a piston member reciprocable in said pneumatic cylinder, a piston rod member movable with said piston, distributing valve means for alternately connecting said high pressure air supply to opposite sides of said cylinder in accordance with motion of said piston rod, link means connecting said piston rod to each of said operating arms whereby reciprocation of said piston rod imparts oscillatory rotary motion to said brush supporting shafts through said link means.

(References on following page)

References Cited in the file of this patent

UNITED STATES PATENTS

| | | | |
|---|---|---|---|
| 735,162 | Settino | Aug. 4, | 1903 |
| 1,218,155 | Zimmerman | Mar. 6, | 1917 |
| 1,274,345 | Sterling | July 30, | 1918 |
| 1,352,186 | Flanagan | Sept. 7, | 1920 |
| 1,625,434 | Smith | Apr. 19, | 1927 |
| 1,741,997 | Lerch | Dec. 31, | 1929 |
| 1,760,879 | Maynard | June 3, | 1930 |
| 1,850,238 | Maynard | Mar. 22, | 1932 |
| 1,876,967 | Krause et al. | Sept. 13, | 1932 |
| 1,983,684 | Strong | Dec. 11, | 1934 |
| 2,069,844 | Paasche | Feb. 9, | 1937 |
| 2,150,462 | Schultz et al. | Mar. 14, | 1939 |
| 2,151,963 | Fladmark | Mar. 28, | 1939 |
| 2,170,043 | Worrall | Aug. 22, | 1939 |
| 2,249,205 | Hansen | July 15, | 1941 |
| 2,425,332 | Langdon | Aug. 12, | 1947 |
| 2,690,207 | Godfrey | Sept. 28, | 1954 |